Hosmer L. Blum
INVENTOR.
BY Edmund W. E. Kamm

April 10, 1951     H. L. BLUM     2,548,193
LIQUID SAMPLING APPARATUS
Filed July 5, 1945     3 Sheets-Sheet 3
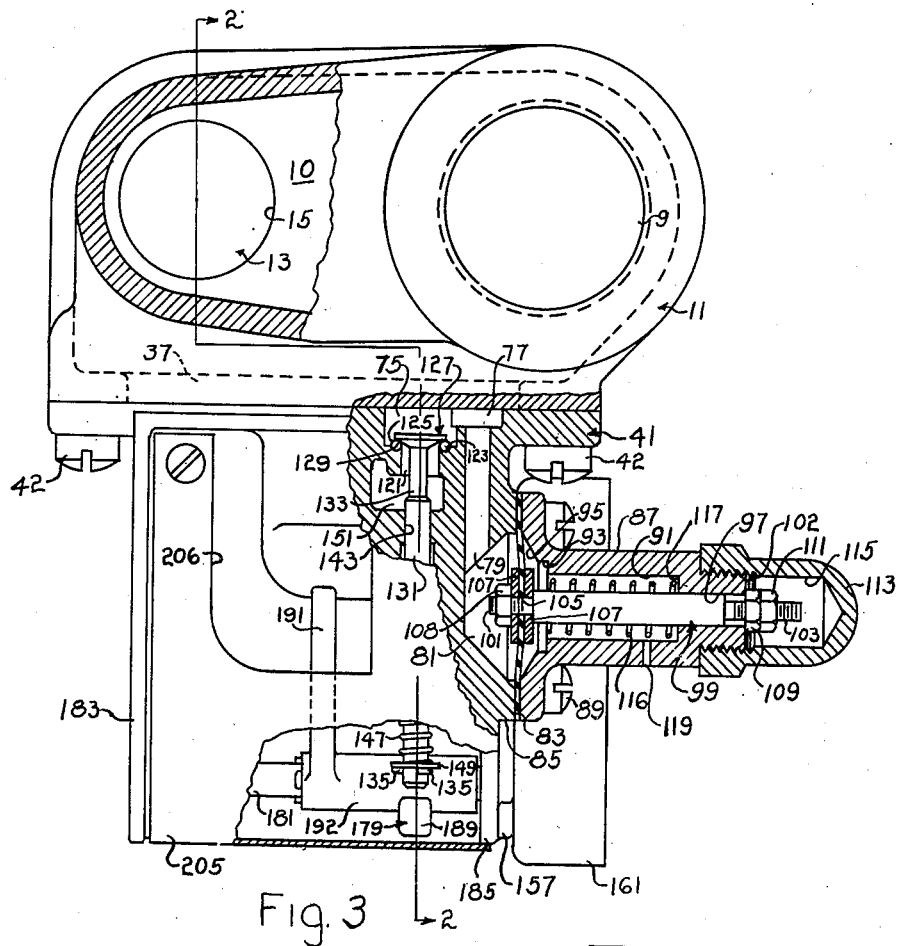
Fig. 3
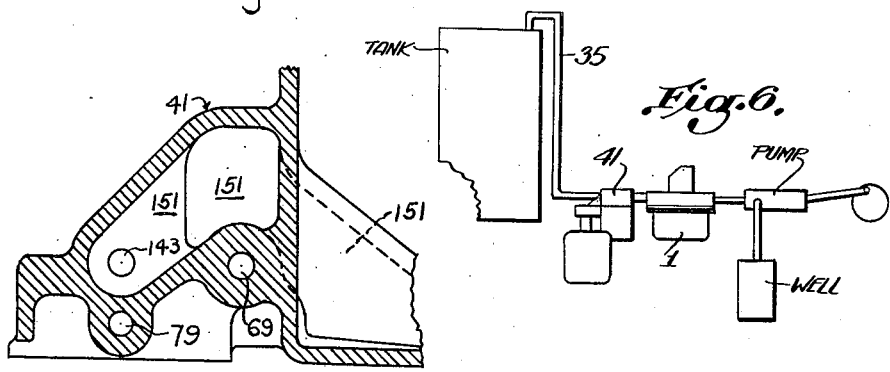
Fig. 4
Fig. 6.
HOSMER L. BLUM
INVENTOR.
BY Edmund W. E. Kamm Patented Apr. 10, 1951

2,548,193

UNITED STATES PATENT OFFICE 2,548,193

LIQUID SAMPLING APPARATUS

Hosmer L. Blum, Fort Wayne, Ind., assignor to Bowser, Inc., Fort Wayne, Ind., a corporation of Indiana Application July 5, 1945, Serial No. 603,322

14 Claims. (Cl. 73—422)

This invention relates to a liquid sampling device, more specifically, to a sampling device which is connected with a liquid meter and will take a representative sample of a liquid being metered which is proportional in quantity to the quantity of liquid metered over a given period.

One use of this sampling device is to take a representative sample of the mixture of crude oil and salt water as it issues from an oil well. The sample is collected in a graduate where it is permitted to precipitate and from which direct readings of the quantities of oil and water in the sample are taken. Since the sample is representative of the effluent of the well, the proportions determined by the sample are used to determine the oil productivity of the well.

It is therefore an object of this invention to take a representative sample of the liquid being metered.

It is another object of this invention to take a small representative sample of the metered liquid at regular intervals.

It is still another object of the invention to provide a device which will take a sample having a volume which is in direct proportion to the volume of liquid metered.

It is yet another object of this invention to provide a liquid sampling device in which the proportion of the sample to the metered liquid can be varied.

It is yet another object of this invention to provide a liquid sampling device which will create a uniform mixture of and thereafter take a sample of the metered liquid.

It is still another object of this invention to provide a liquid sampling device which will take a representative sample of liquid in accurate quantities proportionate to the metered liquid.

These and other objects of the invention will become apparent from a study of this specification and the drawings which are attached hereto and made a part hereof and in which:

Figure 3 is an elevation with parts broken away taken on the line 3—3 of Figure 1, showing the exhaust valve, the diaphragm and port arrangement.

Figure 4 is a sectional view taken on the line 4—4 of Figure 2, showing the sampler outlet port.

Figure 6 is a diagrammatic view of the metering and sampling system.

Figure 1:
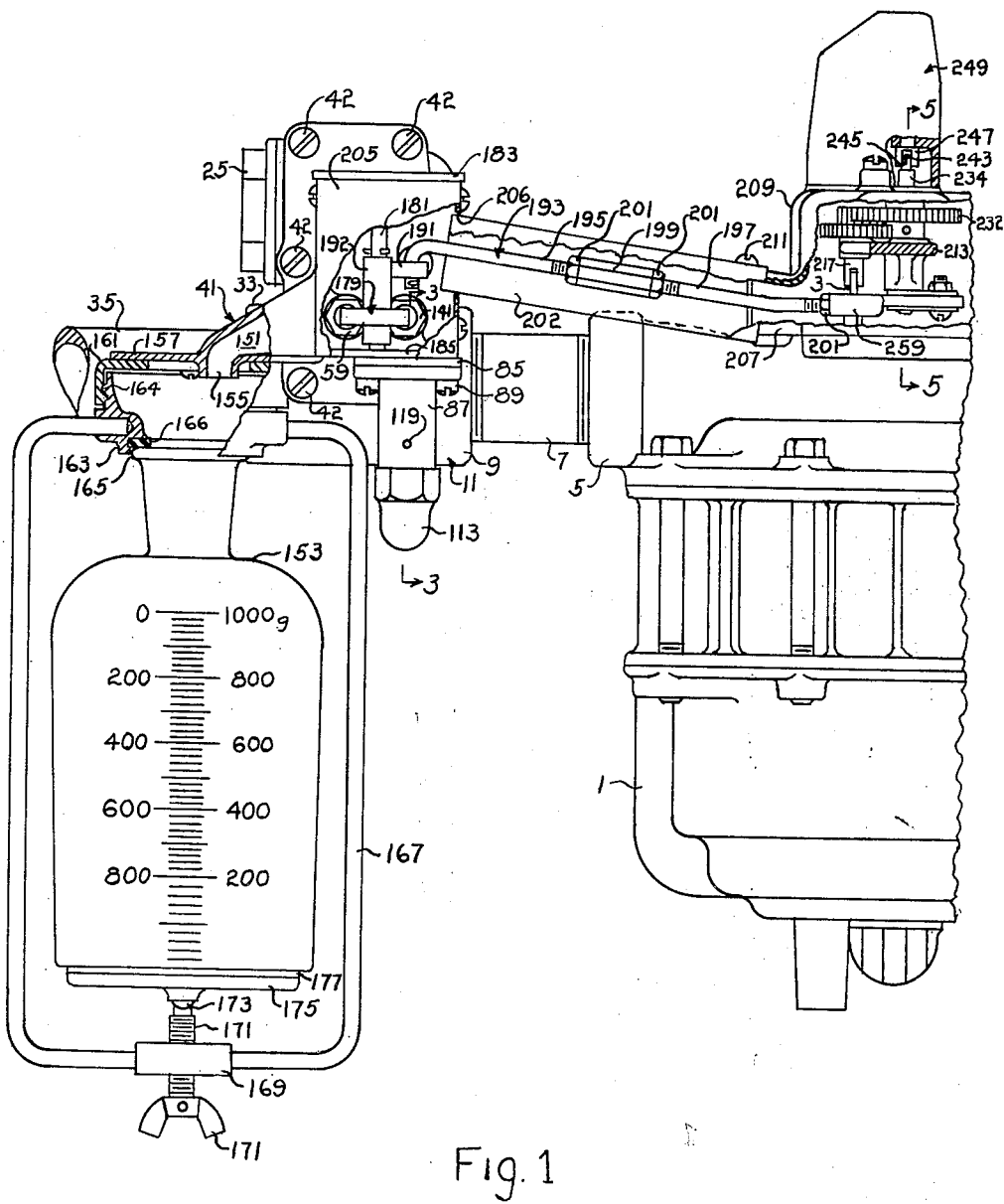
Figure 1 is an elevation with parts broken away showing the sampler and gear case connected to a liquid meter.
Figure 2:
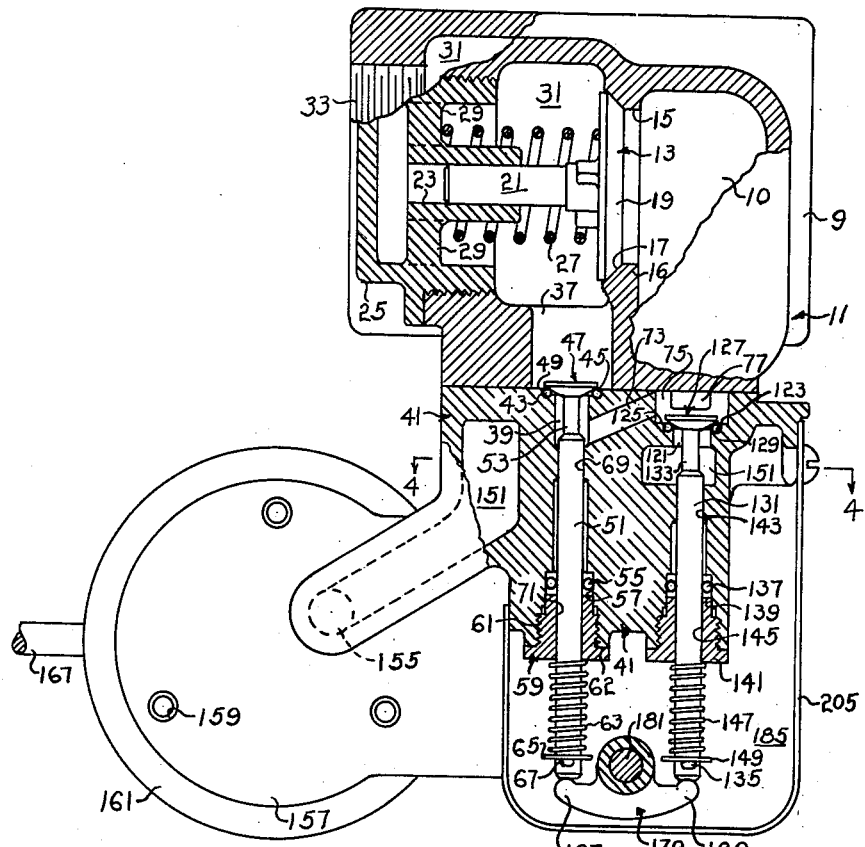
Figure 2 is a sectional view taken on the line 2—2 of Figure 3, showing the check valve and arrangement of the control valves and ports.
Figure 5:
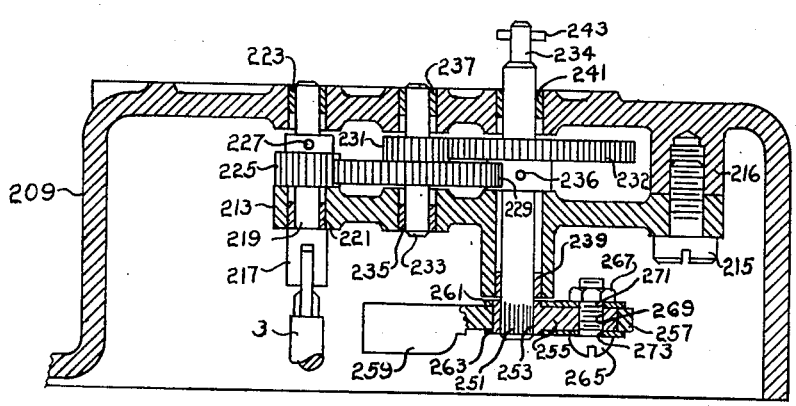
Figure 5 is a sectional view taken substantially on line 5—5 of Figure 1, showing the meter coupling, gearing, crank, and register drive shaft.

Referring to Figure 1 of the drawings, the numeral 1 represents a liquid meter which may be of the positive displacement type typified by that shown in Patent #2,237,518 issued April 8, 1941, to Hosmer L. Blum, for Fluid Meter. This meter has a revolving output shaft 3 extending from the meter head 5. An outlet conduit 7 leads from the meter head and connects with the inlet 9 of the check valve body 11 (Figures 2 and 3). The inlet chamber 10 is in communication with a chamber 31 through a port 15. A check valve 13 controls the port 15, which is formed in a wall 16. A valve seat 17 is machined into the outlet side of the port. The check valve is comprised of a poppet type valve 19, the valve stem 21, the latter of which is guided in a hole 23 in a cap 25 and spring 27, which bears upon the back face of the valve and upon webs 29 of the cap to exert a force tending to keep the valve on its seat. The web structure of the valve cap permits free passage of liquid to relieve the valve stem. The cap 25 is threadedly engaged in the body 11. The check valve opens into the chamber 31 which passes downwardly to the liquid outlet 33 and into the outlet conduit 35.

A port 37 is formed in the check valve body 11 and communicates with the intake chamber 39 in the sampler body 41 (Figure 2). The two bodies are held together by screws 42. The intake chamber 39 has a seat 43 formed to receive a toroid ring 45 of synthetic rubber or other similar material, which serves as a seat for the valve 47.

The valve 47 is provided with a valve seating surface 49 which is machined on the stem side, preferably at a 90° included angle, to rest upon the seat 45 and a stem 51 having a reduced portion 53 adjacent the seating surface. A second toroid seal 55 is received in a counterbore 57 in body 41 and compressed between the stem and the counterbore to act as a seal. It is held in the counterbore by means of a packing nut 59 which is piloted into bore 57 and is drawn down by threads 61 against shoulder 62 of body 41. A spring 63 bears against the packing nut and the washer 65, which is positioned by a cotter pin 67 which passes through the valve stem, so as to exert a force upon the valve 47 adapted to move it to seat on toroid 43. Bearings 69 and 71 for the stem are provided in the body 41 and the packing nut 59, respectively.

A port 73 connects the intake port 39 with a chamber 75 which in turn leads into the passages 77 and 79, the latter terminating in the diaphragm or measuring chamber 81 (Figure 3). The diaphragm 83 extends across the face of the chamber and is clamped to a boss 85, formed on the sampler body 41, by the diaphragm cap 87 and screws 89 to form a liquid-tight joint. The diaphragm cap has a bore 91, a counterbore 93 and a countersunk portion 95, the latter serving as a support for the diaphragm on the inlet stroke. A bearing 97 is formed in the outer end of the diaphragm cap for the diaphragm stem 99 which has a reduced, threaded, diameter at the inner and outer ends, designated by the numerals 101 and 103, respectively. The end 101 extends through a hole 105 in the diaphragm which is supported between washers 107 and is clamped against the shoulder on the stem by nut 108. Nuts 109 and 111 are threadedly mounted on the end 103 and are adapted to engage the end 102 of the cap as a stop so as to adjust and maintain the stroke of the diaphragm. An acorn nut 113 having a recess 115 to receive the diaphragm stem end 103 and the nuts 109 and 111, threadedly engages the diaphragm cap. A spring 116 bears upon one washer 107 and on shoulder 117 formed at the junction of bores 91 and 97 in the diaphragm cap to normally maintain the diaphragm in the position away from the surface 95 and nut 109 against surface 102. The chamber 81 is at its smallest volume under these conditions. A hole 119 in the diaphragm cap connects the bore 91 with the atmosphere.

Chamber 75 is connected with the discharge port 121 which is controlled by the discharge valve 127. A recess 123 receives a toroid ring 125 of resilient material, similar to ring 45, which serves as a seat for the discharge valve 127. The valve is formed like the intake valve 47, but its stem 131 is shorter. The discharge valve 127 has a seating surface 129 on the stem side, a stem 131, a reduced diameter 133 on the stem adjacent the seating surface and a hole at the end opposite the seating surface to receive a cotter pin 135. The toroid seal 137 received by the counterbore 139 and the packing nut 141 are similar to the corresponding parts of the intake valve. It will be noted that the plane of the seat 45 of the intake valve is spaced outwardly from the plane of the seat 125 because the outlet side of valve 47 must be connected with the inlet side of valve 127.

Bearings 143 and 145 are formed in the body 41 and packing nut 141 to guide the discharge valve stem. Spring 147 is confined between the washer 149 and the nut 141.

Port 121 opens into a channel 151 which extends up and over the intake valve 47 and its chamber 39 and extends laterally and downwardly to discharge into the graduate 153 through hole 155 (Figure 1).

A flat, substantially circular pad 157 is cast as a part of the sampler body 41 and has three tapped holes 159 arranged to support the graduate adapter 161. A second adapter 163 with mating male threads 164 receives the mouth of the graduate 165 which seats on gasket 166 and also secures the bail 167 in a swiveling position. The bail is fixed at its lower end to a disc 169 which has a threaded hole in it to receive a thumb screw 171. A ball 173 is formed on the upper end of the screw and mates with a socket in the support plate 175. A resilient washer 177 is cemented to the support plate and cushions the graduate.

A rocker 179 is journaled upon shaft 181 (Figures 2 and 3) which is fixed in the side members 183 and 185 of the sampler body 41. The rocker has two arms 187 and 189 extending laterally and equidistant from the shaft and at 180° from each other. The arm 187 engages the end of the intake valve 47 and the arm 189 engages the end of the discharge valve 127. Another arm 191 is formed on the hub 192 of the rocker and serves as an actuating arm for the rocker.

The arm 191 is actuated by an adjustable length link 193 (Figure 1) which is connected at the other end to the meter driven gear mechanism. A shroud 205 is shaped to substantially enclose the intake and discharge mechanism. A hole 206 is cut in the shroud to provide entrance of the link 193 into the arm 191.

Link 193 is comprised of rod 195 engaging arm 191, rod 197 screwed into boss 259, and a turnbuckle 199 provided with right and left hand threads for adjusting the length of the link. Locknuts 201, one on either side of the turnbuckle and another butting against the end of boss 259 maintain the link in its adjusted position.

A U-shaped shroud 202 covers the linkage and is received by hole 206 at the sampler body end and fits over an extended boss 207 formed on the gear case cover 209 where it is fastened by screw 211.

The gear case cover is fastened to the meter head 5 by suitable screws (not shown) and has a bracket 213 fastened in spaced relation with respect to the top of the cover by two screws 215, which enter bosses 216 depending from the cover. The coupling 217 which receives shaft 3 is mounted on the shaft 219, which is journaled in bearings 221 and 223 in the bracket and cover respectively. The spur gear 225 is fastened to the shaft 219 by pin 227 and meshes an idler gear 229 which, along with the pinion 231, is carried by shaft 233 rotating in bearings 235 and 237 in the bracket and cover, respectively. The pinion 231 meshes with a gear 232 which is fastened to the register drive shaft 234 by pin 236. The register drive shaft revolves in bearings 239 and 241 in the bracket and cover, respectively. A pin 243 extends through a hole in the upper portion of the drive shaft and fits into a slot 245 of the coupling 247 of the register 249.

The lower portion of the drive shaft extends through bearing 239 and its free end is knurled at 251 and pressed into the hole 253 in an eccentric disc 255. A band 257 is passed about and has a running fit with the periphery of the eccentric disc and carries a projecting boss 259 which threadedly engages the end of rod 197. The band is held in position on the eccentric by the plates 261 and 263 which are disposed on opposite sides of the eccentric 255 and are held thereon by a screw and nut 265 and 267. The screw passes through mating holes 269, 271 and 273 in the eccentric disc, and plates 261 and 263, respectively.

*Operation*

The meter and attached sampler are installed in a pipe line supplied by either pump or gravity and the meter and sampler, with the exception of the graduate, are filled with the liquid to be metered to evacuate the air. The receiving tank into which discharge line 35 empties is so arranged as to provide a back pressure on the discharge line and this pressure is transmitted to the diaphragm 83 as will appear below.

As the liquid to be metered and from which a sample is to be taken is forced through the meter 1, it leaves by way of the outlet 5 and conduit 7, it passes through the inlet 9 and into and up in the inlet chamber 10 to the port 15 which is closed by the check valve 13. If the pressure in chamber 10 exceeds the sum of the back-pressure in chamber 31 and the pressure exerted on the valve by spring 27, the check valve opens and allows the liquid to enter and drop downwardly in chamber 31 to the outlet 33 and the discharge conduit 35 leading to the receiving tank shown in Figure 6.

The check valve serves a dual function, namely, to prevent any surge such as caused by the pump from creating a fluttering of the diaphragm and thus disturbing the accuracy of the sample; and also to cause a uniform mixing of the liquid as it passes through the port so that the sample will be uniform and truly representative of the liquid being metered. As the liquid passes by the check valve, it is directed downwardly so as to afford little opportunity for the constituents of the sample to stratify.

The liquid passing through and volumetrically measured by the meter causes the meter output shaft 3 to revolve. The shaft engages coupling 217 which is connected to a train of gears by shaft 219. The train of gears comprises the gears 225, 229, 231 and 232. This gear train drives the register drive shaft 234 at the rate of one revolution per $\frac{1}{10}$ barrel (42 gallons).

An eccentric is connected to the end of the register drive shaft 234 opposite the register and turns with the register drive shaft.

The eccentric is connected to linkage 193, and together they convert the rotary motion of the register shaft into a reciprocating motion and transfer the reciprocating motion to the rocker 179, which opens the intake valve 47 and closes it, and thereafter opens the discharge valve 127 and closes it, in repeated cycles.

As the intake port opens, liquid is forced by the back pressure through the ports 37, 39, 73, chamber 75, 77 and 79 into the diaphragm chamber 81 (Figure 3) forcing the diaphragm 83 back against the resistance of spring 116 until the washer 107 strikes the shoulder formed by bore 91 and counterbore 93 in which position the diaphragm rests on its seat 95. A 90° revolution of the eccentric causes the intake valve to be relieved by the rocker and the valve is closed by its spring, so that it traps the liquid in the ports and chambers just described. Another 90° revolution of the eccentric opens the discharge valve, which relieves the pressure on the diaphragm 83 which, actuated by spring 116, moves off its seat to the left until nut 109 strikes surface 102 and expels a definite quantity of the trapped liquid from chamber 81 through ports 79, 77, 75 and 151 (Figures 3 and 4), hole 155 (Figure 1) and into the graduate 153, the graduate being vented through the loosely fitted adapter castings 161 and 163. Thereafter the discharge valve is closed and the parts are in position to repeat the cycle.

The constituents of the sample, which may be oil and salt water, usually separate by gravitation and a reading can be made of the graduate to determine relative quantities of each constituent.

The stroke of the diaphragm 83 and therefore the quantity of liquid expelled upon each stroke is governed by the adjusting nut 109, which is threaded onto the end 103 of the diaphragm stem. Shortening the stroke will decrease, and lengthening the stroke will increase the size of the sample. The diaphragm of the sampler as shown may be adjusted to any capacity between the limits of .2 cc. and 2 cc. per stroke. In operation the stroke is generally set for a sample of 1 cc., which at ten revolutions of the register shaft per barrel (42 gallons) would take a sample of 10 cc. per barrel.

In the event there are pulsations in the pipe line which would cause the line pressure to fall below that required to overcome the spring 116, it will be seen that the valve 47 could conceivably close while the diaphragm occupied a position away from its seat and consequently little or no liquid would be discharged to the graduate upon the opening of valve 127 and the sample would not be proportionate with the liquid dispensed by the meter. The check valve 13 prevents this by closing as soon as the flow through port 15 stops. Therefore the diaphragm is always subjected to the equivalent of the back pressure of the discharge line or more.

Further, since the check valve is operated by the flow of fluid, it rides nearer to or farther from its seat, depending upon the volume of the flow, and thus exerts a constant restriction on the stream flowing through the port. This promotes turbulence in this stream which promotes uniformity in the mixture of the constituents of the stream.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a liquid measuring system, the combination of a conduit for liquid, means for passing liquid through said conduit, a meter in said conduit, a sampling mechanism in said conduit, said mechanism comprising positive displacement means having an inlet connected to the conduit and being constructed and arranged for operation through a cycle of events to withdraw a predetermined quantity of liquid from said conduit and store it, means connecting said meter to operate said sampling mechanism in synchronism with it, and a flow opened, spring closed check valve in said conduit, upstream of and close to said inlet, for mixing the constituents of the liquid flowing in said conduit.

2. In a liquid measuring system, the combination of a conduit for liquid, means for passing liquid through said conduit, a meter in said conduit, a sampling mechanism in said conduit, said mechanism having an intake connected with said conduit and a positive displacement means which is responsive to back pressure applied to said intake and being constructed and arranged for operation through a cycle of events to withdraw a predetermined quantity of liquid from said conduit and store it, means connecting said meter to operate said sampling mechanism in synchronism with it, means for creating back pressure at said intake and means for normally urging the valve closed, a flow opened check valve in said conduit immediately upstream of said intake for forming a uniform mixture of the liquid in said conduit and for maintaining back pressure at said intake.

3. In a liquid measuring system, the combination of a conduit for liquid, means for passing liquid through said conduit, a meter in said conduit, a sampling mechanism in said conduit, said mechanism having an inlet connected with said conduit and being constructed and arranged for operation through a cycle of events to withdraw a predetermined quantity of liquid from said conduit and store it, means connecting said meter to operate said sampling mechanism in synchronism with it, and a normally closed, flow opened check valve in said conduit immediately adjacent and upstream of said inlet.

4. In a liquid measuring system, the combination of a conduit for liquid, means for passing liquid through said conduit, a meter in said conduit, a sampling mechanism in said conduit, said mechanism having an inlet connected with said conduit and being constructed and arranged for operation through a cycle of events to withdraw a predetermined quantity of liquid from said conduit upon the application of back pressure to said mechanism and thereafter store it, and means connecting said meter to operate said sampling mechanism in synchronism with it, a flow actuated check valve in said conduit immediately adjacent and upstream of said inlet, and means cooperating with said valve for maintaining a back pressure on said conduit downstream of said inlet and check valve.

5. In a sampler mechanism adapted for attachment to a liquid flow line, a receptacle, a body member having a chamber, displacement means in said chamber, yieldable means for urging said displacement means in one direction, an inlet passage, means for continuously applying liquid to said flow line and to said passage under a pressure sufficient to overcome said yieldable means, a discharge passage leading to the receptacle, valves in said passages, means connecting said chamber with said passages and means operable in accordance with the rate of flow of liquid in said flow line for opening and closing first said inlet valve to admit fluid to said valve chamber from said inlet passage against the action of said yieldable means and thereafter said discharge valve to eject fluid from said chamber into said discharge passage and receptacle under the action of said yieldable means.

6. In a sampler mechanism adapted for attachment to a liquid flow line, a body member having a chamber, displacement means in said chamber, yieldable means for urging said displacement means in one direction, an inlet passage, means for continuously applying liquid to said flow line and to said passage under a pressure sufficient to overcome said yieldable means, a discharge passage, valves in said passages, means connecting said chamber with said passages, means operable in accordance with the rate of flow of liquid in said flow line for opening and closing first said inlet valve to admit fluid to said chamber from said inlet passage against the action of said yieldable means and thereafter said discharge valve to eject fluid from said chamber into said discharge passage under the action of said yieldable means, and a sample collecting vessel mounted in said mechanism and in communication with said discharge passage.

7. In a sampler mechanism adapted for attachment to a liquid flow line, a receptacle, a body member having a chamber, displacement means in said chamber, yieldable means for urging said displacement means in one direction, adjustable means for limiting the stroke of said displacement means, an inlet passage, means for continuously applying liquid to said flow line and to said passage under a pressure sufficient to overcome said yieldable means, a discharge passage leading to the receptacle, valves in said passages, means connecting said chamber with said passages and rocker means operable in accordance with the rate of flow of liquid in said flow line for opening and closing said valves alternately to admit fluid to said chamber from said inlet passage and thereafter to eject fluid from said chamber into said discharge passage and receptacle.

8. In a sampler mechanism, a receptacle, a body member having a chamber, displacement means in said chamber, an inlet passage, a discharge passage leading to the receptacle, valves in said passages, means connecting said chamber with said passages and valve operating means for opening and closing said valves to admit fluid to said chamber from said inlet passage and thereafter to discharge fluid from said chamber into said discharge passage and receptacle, a flow line having an inlet and an outlet, said valve operating means being disposed in said flow line and responsive to the rate of flow of liquid therethrough, said inlet passage being connected with said flow line between the inlet and outlet, and a spring loaded check valve mounted in said flow line between the inlet and said inlet passage.

9. In a sampler mechanism, a body member having a chamber, displacement means in said chamber, an inlet passage, a discharge passage, valves in said passages, means connecting said chamber with said passages, means for opening and closing said valves to admit fluid to said chamber from said inlet passage and thereafter to eject fluid from said chamber into said discharge passage, a flow line having an inlet and an outlet, said valve opening means being in said flow line and responsive to the rate of flow of liquid in said flow line, said inlet passage being connected with said flow line between the inlet and outlet, that portion of said flow line immediately upstream of said inlet passage being disposed in substantially vertical run.

10. In a sampler mechanism, a body member having a chamber, displacement means in said chamber operated by power in one direction, an inlet passage, a sample discharge passage, valves in said passages, means connecting said chamber with said passages, a meter for opening and closing said valves to admit fluid to said chamber from said inlet passage and thereafter to eject fluid from said chamber into said discharge passage upon power operation of said displacement means, a flow line having an inlet and an outlet, said meter being in said flow line and operable in proportion to the rate of flow of liquid in said flow line, said inlet passage being connected with said flow line between the inlet and outlet, that portion of said flow line immediately upstream of said inlet passage being disposed in substantially vertical run, and liquid mixing means in said flow line at the start of said run.

11. In a liquid measuring system the combination of a conduit for liquid, means for passing liquid through said conduit, a sampling mechanism comprising a positive displacement means having an inlet connected with said conduit and an outlet, said mechanism being constructed and arranged for operation to withdraw a predetermined quantity of sample liquid from said conduit through said inlet and to thereafter discharge it through said outlet, means for actuating said mechanism in accordance with the rate of flow of liquid in said conduit, and a flow actuated check valve in said conduit upstream of and near said inlet for mixing the constituents of said liquid so that the sample entering the inlet will be a true sample of the liquid flowing in the conduit.

12. In a liquid sampling system the combination of a conduit for liquid, means for passing liquid through said conduit, sampler means having an inlet connected to said conduit for removing samples of liquid therefrom and a flow actuated check valve in said conduit upstream of and near said sampler inlet for mixing the constituents of said liquid.

13. In a liquid measuring system, the combination of a conduit for liquid, means for passing liquid through said conduit, a meter in said conduit, a sampling mechanism in said conduit, means for maintaining a back pressure on the liquid in said conduit at said mechanism, said mechanism comprising positive displacement means adapted for operation in one direction by said back pressure and in the other direction by a power mechanism and being constructed and arranged for operation through a cycle of events to withdraw a predetermined quantity of liquid from said conduit, store it and later discharge it, a receptacle for receiving the predetermined quantity when it is discharged and means connecting said meter to control the operation of said sampling mechanism to maintain the mechanism in synchronism with the meter.

14. In a liquid measuring system, the combination of a conduit for liquid, means for passing liquid through said conduit, a meter in said conduit, a sampling mechanism comprising positive displacement means in said conduit, means for maintaining a back pressure on the liquid in said conduit at said displacement means, said displacement means being adapted for operation by the application of back pressure thereto and being constructed and arranged for operation through a cycle of events to withdraw a predetermined quantity of liquid from said conduit and store it, and means connecting said meter to control the operation of said sampling mechanism to maintain the mechanism in synchronism with the meter.

HOSMER L. BLUM.

REFERENCES CITED

The following references are of record in the file of this patent:

UNITED STATES PATENTS

| Number | Name | Date |
|---|---|---|
| 1,372,244 | Pasko | Mar. 22, 1921 |
| 1,577,579 | Hirschler | Mar. 23, 1926 |
| 1,631,454 | Bambach et al. | June 7, 1927 |
| 1,649,399 | Gard | Nov. 15, 1927 |
| 1,691,687 | Watts | Nov. 13, 1928 |
| 1,852,445 | Calkins et al. | Apr. 5, 1932 |
| 1,918,341 | Knaak | July 18, 1933 |
| 1,985,173 | Kent | Dec. 18, 1934 |
| 2,121,892 | Stiner | June 28, 1938 |
| 2,154,529 | Raymond | Apr. 18, 1939 |
| 2,183,338 | Slough | Dec. 12, 1939 |
| 2,217,855 | Bassler | Oct. 15, 1940 |
| 2,252,923 | Granetz | Aug. 19, 1941 |
| 2,272,313 | Waters | Feb. 10, 1942 |
| 2,277,714 | Polston et al. | Mar. 31, 1942 |
| 2,322,018 | Huber | June 15, 1943 |
| 2,350,905 | Koehler | June 6, 1944 |
| 2,374,557 | Millikan | Apr. 24, 1945 |

FOREIGN PATENTS

| Number | Country | Date |
|---|---|---|
| 329,556 | France | Feb. 19, 1903 |